R. L. MATTESON.
FLYING MACHINE.
APPLICATION FILED APR. 4, 1910.
1,024,011.
Patented Apr. 23, 1912.
2 SHEETS—SHEET 1.
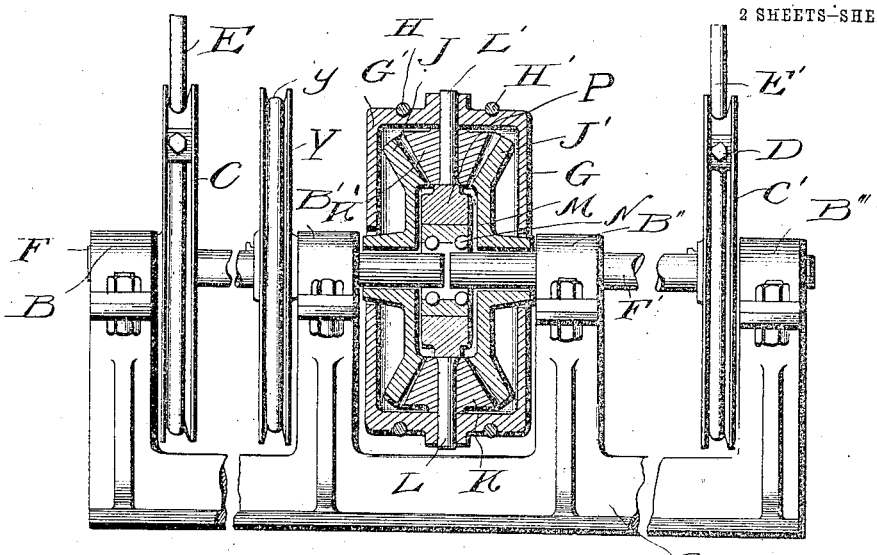
Fig. 1.
Fig. 2.
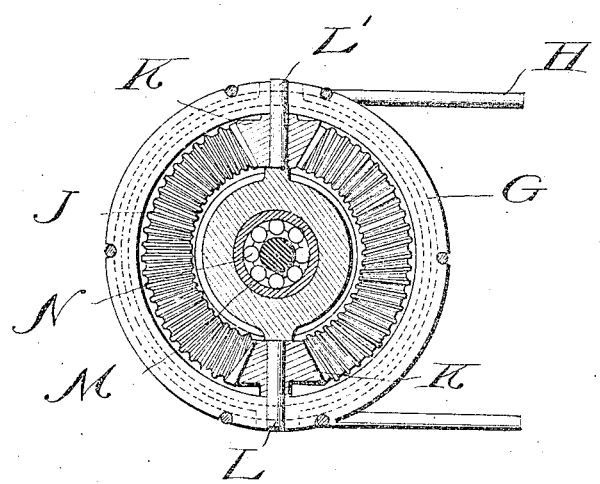
Witnesses
Jas. E. Dodge
B. B. Collings.
Inventor
Roy L. Matteson.
By Wilkinson, Fisher & Witherspoon
Attorneys.

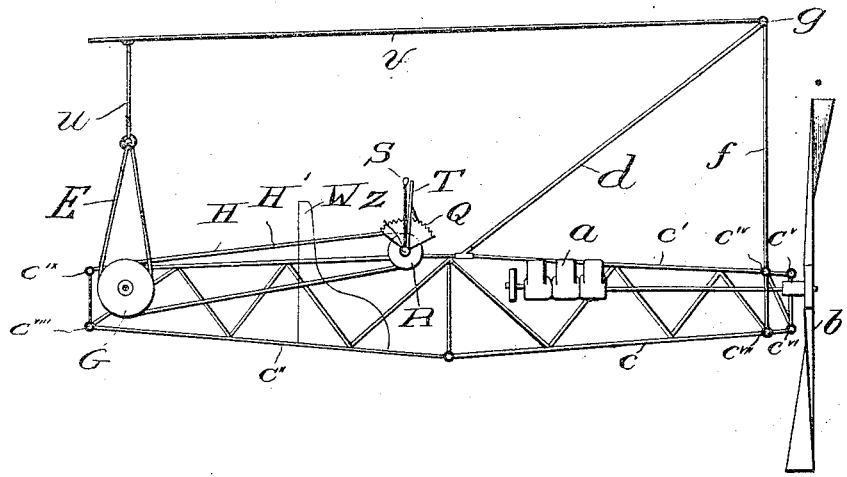
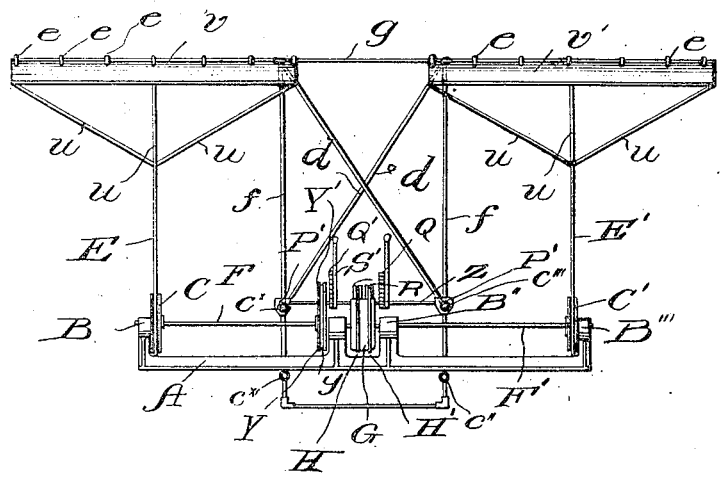

UNITED STATES PATENT OFFICE.

ROY LOUIS MATTESON, OF SANTA MARIA, CALIFORNIA.

FLYING-MACHINE.

1,024,011.   Specification of Letters Patent.   Patented Apr. 23, 1912.

Application filed April 4, 1910.   Serial No. 553,321.

*To all whom it may concern:*

Be it known that I, ROY L. MATTESON, a citizen of the United States, residing at Santa Maria, in the county of Santa Barbara and State of California, have invented certain new and useful Improvements in Flying-Machines; and I do hereby declare the following to be a full, clear, and exact description of the invention, such as will enable others skilled in the art to which it appertains to make and use the same.

My invention relates to improvements in flying machines in which two or more planes work in conjunction, and the object of my invention is to provide suitable connections whereby the pressure on the different planes automatically balances the machine.

Further objects of my invention are to so connect the planes that this balancing effect is made possible and easy, to connect the planes by means which acts automatically, does not get out of order, and is not operated by an outside source, and which furthermore may be used for vertical or horizontal steering.

With the objects stated in view, my invention consists in the construction and combinations of parts as hereinafter described and claimed.

In the accompanying drawings—Figure 1 is a front view, partly in section, of a portion of the balancing connections. Fig. 2 is a central cross section of said connections. Fig. 3 is a side view of the invention provided with the balancing devices, and Fig. 4 is a rear view of the same.

A represents the stand on which are mounted the balancing devices and operating means, this stand being provided with bearings B, B', B'', and B'''.

F and F' represent shafts in line with each other and passing through said bearings, the shaft F being mounted in the bearings B, B' and the shaft F' being mounted in the bearings B'' and B'''. On the shaft F is keyed a beveled gear wheel J, and on the shaft F' is secured a similar gear wheel J'.

K is a beveled pinion mounted on the pin L carried on the annulus P, and K' is a similar beveled pinion mounted on the pin L' carried by said annulus and located opposite to the pin L'. The pinions K and K' each of them engage with the beveled gear wheels J and J'.

M represents a ring, preferably made of hardened steel, inside of the annulus P, and this ring has on its interior a plurality of race ways in which are mounted friction balls N, which bear upon the shafts F and F'. The gear wheels and pinions are inclosed in a housing made of two parts G, G', which are bolted together, and which are provided with bearings for the pins L, L'. The parts of the housing are grooved on the outside, and in the grooves are carried wire ropes H and H', respectively. Keyed to the shaft F are two sheaves C and Y, and keyed to the shaft F' is a sheave C'. Ropes E and E' run over the sheaves C and C', respectively.

W indicates the seat for the operator.

The framework is made up of rods braced in various positions and numbered $c$, $c'$, etc. to $c^{xi}$, which carries the stand A at the rear. Rods $f$, $f$, provided with braces $d$, support a horizontal rod $g$, to which the planes $v$, $v'$ are attached by means of rings $e$. The rope or cable E, which passes over the sheave or pulley C, is attached by braces $u$ to the plane $v$, and similarly the rope or cable E' is attached to the plane $v'$.

The housing G, G' can be turned by the ropes H, H', which ropes pass over the double sheave or pulley R, mounted on the shaft or rod Z, said shaft being carried by bearings P' on the framework. The shaft Z, and therefore the double pulley R, may be moved by the operator by means of a lever S, and can be stopped in any desired position by the pawl T, carried by the segment Q. On the shaft Z is also mounted another lever S', which may be stopped in any desired position by means of a pawl engaging with the quadrant Q', and on this shaft or rod Z is also mounted a pulley or sheave Y', which is connected with the pulley Y on the shaft F by a cord or cable $y$.

$a$ represents an engine of any desired type, and $b$ a propelling wheel mounted in front of the machine.

Supposing a gust of wind strikes the plane $v$, tending to tip the machine, this gust would tend to raise the plane $v$, pulling upon the rope E. This would turn the pulley C, shaft F, and beveled gear wheel J in the housing, and this movement would be transmitted to the pinions K, K'. The latter would move the beveled gear wheel J' in the opposite direction to the movement of the gear wheel J, and the shaft F and pulley C being connected so as to move with the gear wheel J', will wind up or shorten the cord or cable E', thus pulling the plane v' down. In other words, when the plane v moves up, the plane v' moves down, or vice versa. In other words, when the pressure is greater on one plane than on the other, the angle of the plane having the lesser resistance will be increased automatically until the resistance, or lifting power, of the planes becomes equal. Furthermore, this arrangement renders vertical steering possible. By moving the lever S, which in turn moves the pulley R, the ropes H, H', the housing G, G', and pinions K, K' are all moved, and they travel through the same length of arc, and the movement of the double housing G, G' does not interfere with the automatic action of the separate planes. The motion thus transmitted moves the pulleys C, C', the ropes E, E', and planes v, v', in the same direction. This enables the operator to ascend if he increases the angles of the planes, or to descend if he decreases the angles, thus making vertical steering possible.

By moving the lever S', motion is imparted through the sheaves Y, Y' and cord y to the shaft F, and the movement of this shaft operates the beveled gear wheel J, and said beveled gear wheel, acting through the pinions K, K', will move the beveled gear wheel J' in the opposite direction. This motion is transmitted to the plane v' by means of the cord or rope E', sheave C', and shaft F', compelling the planes v, v' to move in opposite directions, making horizontal steering possible. Turning from left to right, or vice versa, for any extended period, can be maintained by locking the lever S' by means of the pawl T' and segment Q' when the planes v, v' have been set in their desired positions. When moving in a straight course, the lever S' is free to move in either direction on the segment Q'.

Although I have described the planes as being attached to the keel or stand by ropes or cords, they may, of course, be so attached by means of metal cables or sprocket chains, or a combination of either or all of the same.

I claim:—

1. In a flying machine, the combination of two planes, differential gears and sheaves rotatable thereby, a series of ropes connecting the sheaves to the planes, a casing for said gears and movable therewith, said casing serving as sheaves, a lever system including pulleys, and connections between said pulleys and said movable casing, substantially as described.

2. In a flying machine, the combination of two planes, differential gears and sheaves rotatable thereby, a series of ropes connecting the sheaves to the planes for the purpose of automatically balancing them, a pulley connected to one of the sheaves and to one of the gears, a lever, a rope connecting the lever to the pulley, and a pawl and ratchet device for fixing said lever in various positions for the purpose of steering the machine, substantially as described.

3. In a flying machine, the combination of two planes, differential gears and sheaves rotatable thereby, a series of ropes connecting the sheaves to the planes, a casing for said gears and movable therewith, said casing serving as sheaves, a lever system including pulleys, connections between said pulleys and said movable casing, a second pulley connected to one of the sheaves and to one of the gears, a lever, a rope connecting the second lever to the second pulley, and a pawl and ratchet device for fixing each of said levers in various positions, substantially as described.

In testimony whereof, I affix my signature, in presence of two witnesses.

ROY LOUIS MATTESON.

Witnesses:
JOHN F. CONKEY,
L. C. MAU.